US012620585B2

(12) United States Patent
Kushima et al.

(10) Patent No.: US 12,620,585 B2
(45) Date of Patent: May 5, 2026

(54) NICKEL AND COBALT-FREE CATHODE FOR LITHIUM-ION BATTERIES AND METHOD OF MANUFACTURE

(71) Applicants: University of Central Florida Research Foundation, Inc., Orlando, FL (US); Honda Motor Co., Ltd., Tokyo (JP)

(72) Inventors: Akihiro Kushima, Orlando, FL (US); Yoshiya Fujiwara, Wako (JP); Yoshiyuki Morita, Wako (JP); Akihisa Tanaka, Wako (JP); Kazuki Chiba, Wako (JP)

(73) Assignees: University of Central Florida Research Foundation, Inc., Orlando, FL (US); Honda Motor Co., Ltd., Tokyo (JP)

( * ) Notice: Subject to any disclaimer, the term of this patent is extended or adjusted under 35 U.S.C. 154(b) by 643 days.

(21) Appl. No.: 18/050,598

(22) Filed: Oct. 28, 2022

(65) Prior Publication Data

US 2023/0155124 A1     May 18, 2023

Related U.S. Application Data

(60) Provisional application No. 63/275,208, filed on Nov. 3, 2021.

(51) Int. Cl.
H01M 4/505 (2010.01)
H01M 4/04 (2006.01)
(Continued)

(52) U.S. Cl.
CPC ......... H01M 4/505 (2013.01); H01M 4/0416 (2013.01); H01M 4/0471 (2013.01);
(Continued)

(58) Field of Classification Search
CPC ....... H01M 4/485; H01M 4/505; H01M 4/525
See application file for complete search history.

(56) References Cited

U.S. PATENT DOCUMENTS 6,960,335 B1    11/2005  Singhal et al.
2001/0053483 A1*  12/2001  Yamaura ............... H01M 4/505
                                                      429/339
(Continued)

FOREIGN PATENT DOCUMENTS

CN          1658426 A      8/2005
CN          1795574 A      6/2006
(Continued)

OTHER PUBLICATIONS

Bennett, JW et al. Emerging investigator series: first-principles and thermodynamics comparison of compositionally-tuned delafossites: cation release from the (001) surface of complex metal oxides. Environ. Sci.: Nano. May 21, 2020, vol. 7, No. 6, pp. 1642-1651 [online], [retreived on Jul. 9, 2025]. (Year: 2020) Retrieved from <https://pubs.rsc.org/en/content/articlelanding/2020/en/c9en01304k> <doi: 10.1039/C9EN01304K>.*
(Continued)

*Primary Examiner* — Robert S Carrico
(74) *Attorney, Agent, or Firm* — Molly L. Sauter; Trenam Law

(57)             ABSTRACT

A nickel-free and cobalt-free cathode material for a lithium (Li) battery is provided. The cathode material includes, $Li_aAl_{1-x-y-z}Fe_xMn_yZn_zO_{2-\delta}$, wherein a, x, y, z, and δ are in the following ranges: $0.95 \le a \le 1.2$; $0 \le x \le 0.3$; $0 \le y \le 0.3$; $0 \le z \le 0.3$; $0.5 \le x+y+z \le 0.99$; $0 \le \delta \le 0.1$. In various embodiments, the present invention provides an improved Co-free/Ni-free Li-ion battery (LIB) cathode that exhibits good thermal stability and is capable of realizing a high cell voltage and specific capacity comparable to, or exceeding, currently known $Li(NiCoMn)O_2$ cathodes. The novel cath-
(Continued)

ode chemistry in accordance with the embodiments of the present invention eliminates any potential cobalt supply issues and lowers the overall cost of the battery.

6 Claims, 2 Drawing Sheets

(51) Int. Cl.

| | |
|---|---|
| *H01M 4/131* | (2010.01) |
| *H01M 4/1391* | (2010.01) |
| *H01M 4/485* | (2010.01) |
| *H01M 4/525* | (2010.01) |
| *H01M 10/0525* | (2010.01) |

(52) U.S. Cl.
CPC ......... *H01M 4/131* (2013.01); *H01M 4/1391* (2013.01); *H01M 4/485* (2013.01); *H01M 4/525* (2013.01); *H01M 10/0525* (2013.01)

(56) References Cited

U.S. PATENT DOCUMENTS

| | | | |
|---|---|---|---|
| 2007/0122703 | A1 | 5/2007 | Whitfield et al. |
| 2020/0235390 | A1* | 7/2020 | Belharouak ....... H01M 10/0569 |

FOREIGN PATENT DOCUMENTS

| | | | |
|---|---|---|---|
| CN | 102593443 A | 7/2012 | |
| CN | 102593459 A | 7/2012 | |
| CN | 104269517 A | 1/2015 | |
| EP | 1058325 A2 | 12/2000 | |
| JP | 10067517 A | 3/1998 | |
| JP | 2000348722 A | 12/2000 | |
| JP | 2001122628 A | 5/2001 | |

OTHER PUBLICATIONS

Komaba, S. and Kubota, K. Na-Ion Batteries. 1.2 Crystal Structures of Layered Materials [online]. John Wiley & Sons, 2020 [retrieved on Oct. 6, 2025]. Retrieved from the internet: <URL: https://app.knovel.com/hotlink/pdf/id:kt012XJBU6/na-ion-batteries/crystal-structures-layered> (Year: 2020).*

First Office Action issued Dec. 10, 2024 by the State Intellectual Property Office of People's Republic of China for corresponding Chinese Patent Application No. 202211367018.6. Original and machine translation attached.

Machine translation of CN102593443A with Mar. 7, 2012, filing date and Jul. 18, 2012, publication date.

Machine translation of CN1795574A with May 27, 2004, filing date and Jun. 28, 2006, publication date.

Muralidharan, N. et al. LiNixFeyAlzO2, a new cobalt-free layered cathode material for advanced Li-ion batteries, Journal of Power Sources 471 (2020) 228389.

Hirayama, M. et al. Structure and electrode reactions of layered rocksalt LiFeO2 nanoparticles for lithium battery cathode, Journal of Power Sources 196 (2011) 6809-6814.

Decision on Rejection issued Jul. 9, 2025 by the State Intellectual Property Office of People's Republic of China for corresponding Chinese Patent Application No. 202211367018.6. Original document attached.

Notice of Reasons for Refusal issued Jan. 26, 2026 by the Japan Patent Office for corresponding Japanese Patent Application No. 2022-176111. Original document and machine translation attached.

* cited by examiner

NICKEL AND COBALT-FREE CATHODE FOR LITHIUM-ION BATTERIES AND METHOD OF MANUFACTURE

CROSS-REFERENCE TO RELATED APPLICATIONS

This application claims priority to U.S. Provisional Patent Application No. 63/275,208, filed Nov. 3, 2021, and entitled "Nickel and Cobalt-Free Cathode for Lithium-Ion Batteries and Method of Manufacture," which is herein incorporated by reference in entirety.

BACKGROUND OF THE INVENTION

In a typical solid-state lithium-ion battery (LIB), the anode and the cathode are separated by an electrolyte. During the charging and discharging of the battery the lithium ions travel within the electrolyte positioned between the anode and cathode.

Lithium cobalt oxide ($LiCoO_2$) is commonly used as the cathode for Li-ion batteries (LIB). However, less than 10% of the supply of cobalt comes as a primary product, with the remainder of the cobalt supply being produced as a by-product of nickel and copper. Moreover, the source of most of the global cobalt is concentrated in certain regions of the world and there are increasing concerns regarding child labor and unsafe working conditions in the extraction of cobalt in these regions.

Therefore, it is becoming increasingly difficult to meet the increasing demands for Li-ion batteries, particularly for electric vehicle (EV) applications, where the cost of the battery is a significant portion of the overall cost of the vehicle. Additionally, the current Li-ion battery technology does not fully satisfy the current application requirements and further development, beyond the current LIB technology, is essential.

Recently, because of the supply and cost issues related to obtaining cobalt, NCM (nickel, cobalt, manganese) and NCA (nickel, cobalt, aluminum) cathodes, having reduced cobalt content, are being used for EV applications. Additionally, other cathodes, including $LiMn_2O_4$ (lithium manganese oxide) with spinel structure and olivine-type $LiFePO_4$ (lithium iron phosphate) have been commercially used. Among these materials, $LiCoO_2$ and NCM have superior cyclability and charge/discharge efficiency and have been used in a wide range of applications. However, they are less competitive in applications that require mid-capacity to high-capacity batteries, such as EVs, due to their high cost resulting from the use of Ni and Co, which are in limited supply. Alternatively, $LiMn_2O_4$ and $LiFePO_4$ cathodes are low cost, with an abundant supply of Mn/Fe that is environmentally friendly, but they experience low capacities (140-160 mAh/g).

Accordingly, what is needed in the art is a Li-ion battery that does not contain nickel and/or cobalt, while at the same time achieves a high energy density to avoid supply issues and that remains cost competitive. However, it is difficult to eliminate cobalt from the cathode of the LIB because doing so causes instability in the crystalline structure of the cathode, resulting in safety issues. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions or is known to be relevant to an attempt to solve any problem with which this specification is concerned.

SUMMARY OF THE INVENTION

In various embodiments, the present invention provides an improved Co-free/Ni-free Li-ion battery (LIB) cathode that exhibits good thermal stability and is capable of realizing a high cell voltage and specific capacity comparable to, or exceeding, currently known $Li(NiCoMn)O_2$ cathodes. The novel cathode chemistry in accordance with the embodiments of the present invention eliminates the cobalt supply issues and lowers the cost of the battery.

Based on density functional theory (DFT) calculations, the role of Ni, Co, and Mn in an NCM (nickel, cobalt, manganese) cathode have been identified, wherein Mn stabilizes oxygen and Co/Ni compensates for Li+ removal. Through calculations of various elemental combinations, it has been found that Al acts as Mn in NCM to stabilize the oxygen, and Fe, Mn, and Zn act as Ni and Co. The calculation also showed higher cell voltages for Al—Fe—Zn and Al—Mn—Zn combinations. Therefore, $LiAl_xFe_yZn_2O_2$ and $LiAl_xMn_yZn_2O_2$ are proposed as novel cobalt-free cathode materials.

As such, the present invention provides a new chemistry for a cobalt-free layered transition metal oxide cathode for a lithium-ion battery. The proposed cobalt-free cathode provides for lower costs and eliminates the future risk of cobalt supply instability to provide for the sustainable production of batteries.

In various embodiments, a cathode material for use in a lithium (Li)-ion battery is provided. The cathode material comprises, $Li_aAl_{1-x-y-z}Fe_xMn_yZn_2O_{2-\delta}$, wherein a, x, y, z, and $\delta$ are in a range of $0.95 \leq a \leq 1.2$; $0 \leq x \leq 0.3$; $0 \leq y \leq 0.3$; $0 \leq z \leq 0.3$; $0.5 \leq x+y+z \leq 0.99$; $0 \leq \delta \leq 0.1$. As such, the cathode material does not comprise cobalt or nickel.

In one embodiment, a lithium (Li)-ion battery (LIB) is provided that includes, a cathode composed of a cathode material comprising $Li_aAl_{1-x-y-z}Fe_xMn_yZn_2O_{2-\delta}$, wherein a, x, y, z, and $\delta$ are in a range of $0.95 \leq a \leq 1.2$; $0 \leq x \leq 0.3$; $0 \leq y \leq 0.3$; $0 \leq z \leq 0.3$; $0.5 \leq x+y+z \leq 0.99$; $0 \leq \delta \leq 0.1$, an anode and an electrolyte positioned between the anode and the cathode.

The cathode material of the present invention may be synthesized using various method, including, but not limited to, co-precipitation, citrate process, hydrothermal, ion exchange and solid-state reactions.

In a particular embodiment, a co-precipitation method for synthesizing a cathode material for a cathode of a lithium (Li)-ion battery generally includes synthesizing one or more precursors comprising two or more transition metals selected from Al, Mn, Fe and Zn in a predetermined ratio, preparing one or more Li composites, mixing the one or more precursors with the one or more Li composites and calcinating the mixture of the one or more precursors with the one or more Li composites to synthesize a cathode material comprising $Li_aAl_{1-x-y-z}Fe_xMn_yZn_zO_{2-\delta}$, wherein a, x, y, z, and $\delta$ are in a range of $0.95 \leq a \leq 1.2$; $0 \leq x \leq 0.3$; $0 \leq y \leq 0.3$; $0 \leq z \leq 0.3$; $0.5 \leq x+y+z \leq 0.99$; $0 \leq \delta \leq 0.1$.

As such, in the various embodiment, the present invention provides an improved Co-free/Ni-free Li-ion battery (LIB) cathode that exhibits good thermal stability and is capable of realizing a high cell voltage and specific capacity comparable to, or exceeding, currently known $Li(NiCoMn)O_2$ cathodes.

The embodiments are applicable to numerous fields requiring rechargeable batteries, including but not limited to, electric vehicles, portable electronics, and various other applications where high capacity, long cycle lifetime and low cost are required.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
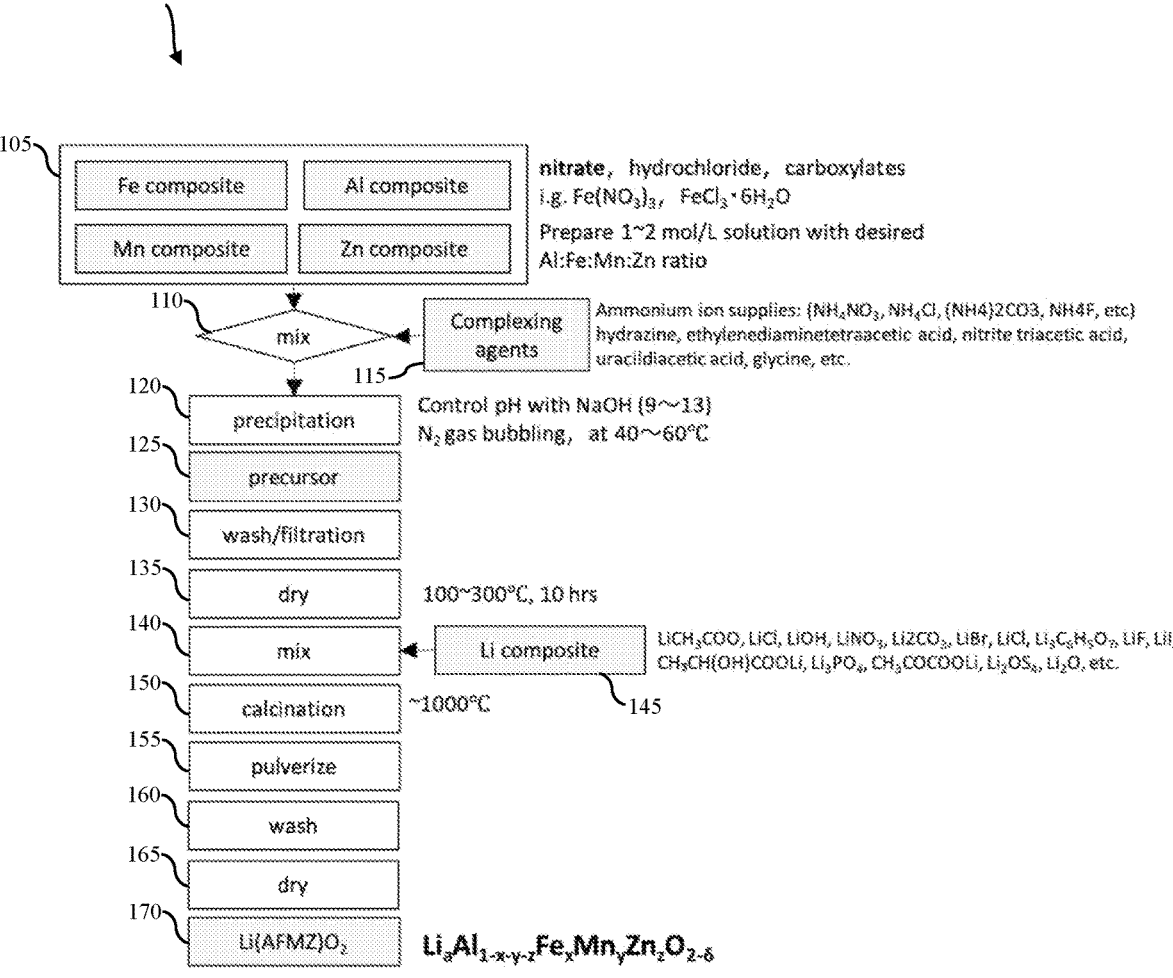
FIG. 1 is a flow diagram illustrating an exemplary co-precipitation method to synthesize $Li(AlFeMnZn)O_2$, in accordance with an embodiment of the present invention.

In the following detailed description of the preferred embodiments, reference is made to the accompanying drawings, which form a part thereof, and within which are shown by way of illustration specific embodiments by which the batteries, that does not contain Ni or Co. A Li-ion battery employing the novel cathode achieves higher specific energy, when compared to a mainstream $Li(NiCoMn)O_2$ (NCM) cathode, with 160-190 mAh/g.

The proposed cathode is a lithium containing transition metal oxide with layered rock-salt structure (space group No. 166) that contains at least one element from Group 1-3, as described in more detail below.

In response to extraction/insertion of Li in R3-m structure and the resulting changes in the crystal structure and electronic state: 1) Group 1 elements provide structural stabilities, 2) Group 2 elements provide both structural stability and compensation for the changes in the electric charges, and 3) Group 3 elements only provide compensation for the changes in the electric charges.

In the NCM cathodes currently known in the art, it is reported that Mn, Co, and Ni function as Group 1, 2, and 3 elements, respectively. The functions described for Groups 1-3 elements are determined based on the magnitude of the ionization tendencies and energies of the transition metal or representative metals. If one arranges atoms in the order of the ionization tendencies (as shown below) and then selects three atoms, the one with the largest ionization tendencies functions as a Group 1 element, followed by Group 2 and 3 elements for the ones with the smaller ionization tendency values.

For example, in NCM, the order of ionization tendencies of the three transition metals is Mn>Co>Ni functioning as Group 1, 2, and 3 elements, respectively. The order of the ionization energy is Ni<Co<Mn.

Ionization tendency:
Li>Cs>Rb>K>Ba>Sr>Ca>Na>Mg>Th>Be>Al>Ti >Zr>Mn>Ta>Zn>Cr>Fe>Cd>Co>Ni>Sn>Pb>H2>Sb>Bi>Cu>Hg>Ag>Pd>Ir Ionization energy:
Ba<Ce<Sr<Ca<Sc<Zr<Ti<Nb<Sn<Pb<Mg<Mn<Ge <Mo<Fe<Si<Cr<Sb<Bi<Co<W<Zn<Ni<Cu The proposed cathode material of the present invention does not contain Ni or Co, the elements are selected from the following list that are favorable as Group 1-3 elements: B, C, Na, Mg, Al, Si, P, S, K, Ca, Sc, Ti, V, Cr, Mn, Fe, Cu, Zn In particular, Al, Mn, Zn, and Fe are ideal elements because of their high theoretical capacity/potential and availability. The combinations of these elements and their functions are as follows:

| | | |
|---|---|---|
| $Li(AlMnFe)O_2$ | Al works as Mn in NCM (structural stability) | Group 1 |
| | Mn works as Co in NCM (charge compensation + stability) | Group 2 |
| | Fe works as Ni in NCM (charge compensation) | Group 3 |
| $Li(AlZnFe)O_2$ | Al works as Mn in NCM (structural stability) | Group 1 |
| | Fe works as Co in NCM (charge compensation + stability) | Group 2 |
| | Zn works as Ni in NCM (charge compensation) | Group 3 |
| $Li(AlMnZn)O_2$ | Al works as Mn in NCM (structural stability) | Group 1 |
| | Mn works as Co in NCM (charge compensation + stability) | Group 2 |
| | Zn works as Ni in NCM (charge compensation) | Group 3 | invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In accordance with various embodiments, the present invention provides a novel cathode for use with Li-ion Al charge is fixed at 3+ and becomes Group 1 element when combined with Fe, Zn, or Mn, and the order of the ionization energies of the three other elements is Mn<Fe<Zn, hence the group allocations.

These materials, since they have layered rock-salt structure, should show XRD peaks between $2\theta = 17.5$-$20.5°$ (Cu-K$\alpha$ X-ray source with $\lambda = 0.15418$ nm).

Commonly used synthesis methods for Li composite oxides include, co-precipitation, citrate process, hydrothermal, ion exchange, and solid-state reactions. The proposed cathode can be synthesized using these processes and is not limited by the synthesis method selected. An example using the co-precipitation method for synthesizing the proposed cathode is explained below with reference to FIG. 1

Co-precipitation, in general, prepares precursors consisting of multiple transition metals, mixes them with Li composites, and calcinates the mixture. A flow chart illustrating the co-precipitation process is shown in FIG. 1.

With reference to FIG. 1, in general, the method for synthesizing a cathode material for a cathode of a lithium (Li)-ion battery includes synthesizing one or more precursors comprising two or more transition metals selected from Al, Mn, Fe and Zn in a predetermined ratio 125, preparing one or more Li composites 145, mixing the one or more precursors with the one or more Li composites 140 and calcinating the mixture of the one or more precursors with the one or more Li composites 150 to synthesize a cathode material comprising $Li_aAl_{1-x-y-z}Fe_xMn_yZn_zO_{2-\delta}$, wherein a, x, y, z, and δ are in a range of $0.95 \le a \le 1.2$; $0 \le x \le 0.3$; $0 \le y \le 0.3$; $0 \le z \le 0.3$; $0.5 \le x+y+z \le 0.99$; $0 \le \delta \le 0.1$.

As shown in FIG. 1, the one or more Li composites may be selected from $LiCH_3COO$, $LiCl$, $LiOH$, $LiNO_3$, $Li_2CO_3$, $LiBr$, $LiCl$, $Li_3C_6H_5O_7$, $LiF$, $LiI$, $CH_3CH(OH)COOLi$, $Li_3PO_4$, $CH_3COCOOLi$, $Li_2OS_4$ and $Li_2O$. Additionally, nitrates, sulfates, hydrochlorides, and carboxylates can be used to synthesize the precursors.

More specifically, synthesizing the one or more precursors includes, dissolving the two or more transition metal composites in solution 105, mixing the solution of the two or more transition metal composites with one or more complexing agents selected from nitrates, sulfates, hydrochlorides, and carboxylates 115 and performing co-precipitation 120 to synthesize the one or more precursors comprising the two or more transition metals.

The method further includes washing/filtrating 130 and drying 135 the one or more precursors prior to mixing the one or more precursors with the one or more Li composites 140. The method also includes, pulverizing 155, washing 160 and drying 165 following the calcinating 150 the mixture of the one or more precursors with the one or more Li composites to synthesize the cathode material comprising $Li_aAl_{1-x-y-z}Fe_xMn_yZn_zO_{2-\delta}$, wherein a, x, y, z, and δ are in a range of $0.95 \le a \le 1.2$; $0 \le x \le 0.3$; $0 \le y \le 0.3$; $0 \le z \le 0.3$; $0.5 \le x+y+z \le 0.99$; $0 \le \delta \le 0.1$.

Using the synthesis route as illustrated in FIG. 1, cathode active materials with the following compositions can be synthesized: $Li_aAl_{1-x-y-z}Fe_xMn_yZn_zO_{2-\delta}$, where a, x, y, z, and δ are in the following ranges: $0.95 \le a \le 1.2$; $0 \le x \le 0.3$; $0 \le y \le 0.3$; $0 \le z \le 0.3$; $0.5 \le x+y+z \le 0.99$; $0 \le \delta \le 0.1$ The cathode synthesized by the method as outlined above comprises a Li containing transition metal oxide with space group R3-m (No. 166). The invention provides a cathode material for Li-ion secondary batteries that contains at least 0.01 mol % of Al as a representative elemental metal and no less than two transition metals selected from Mn, Fe, and Zn.

Figure 2:
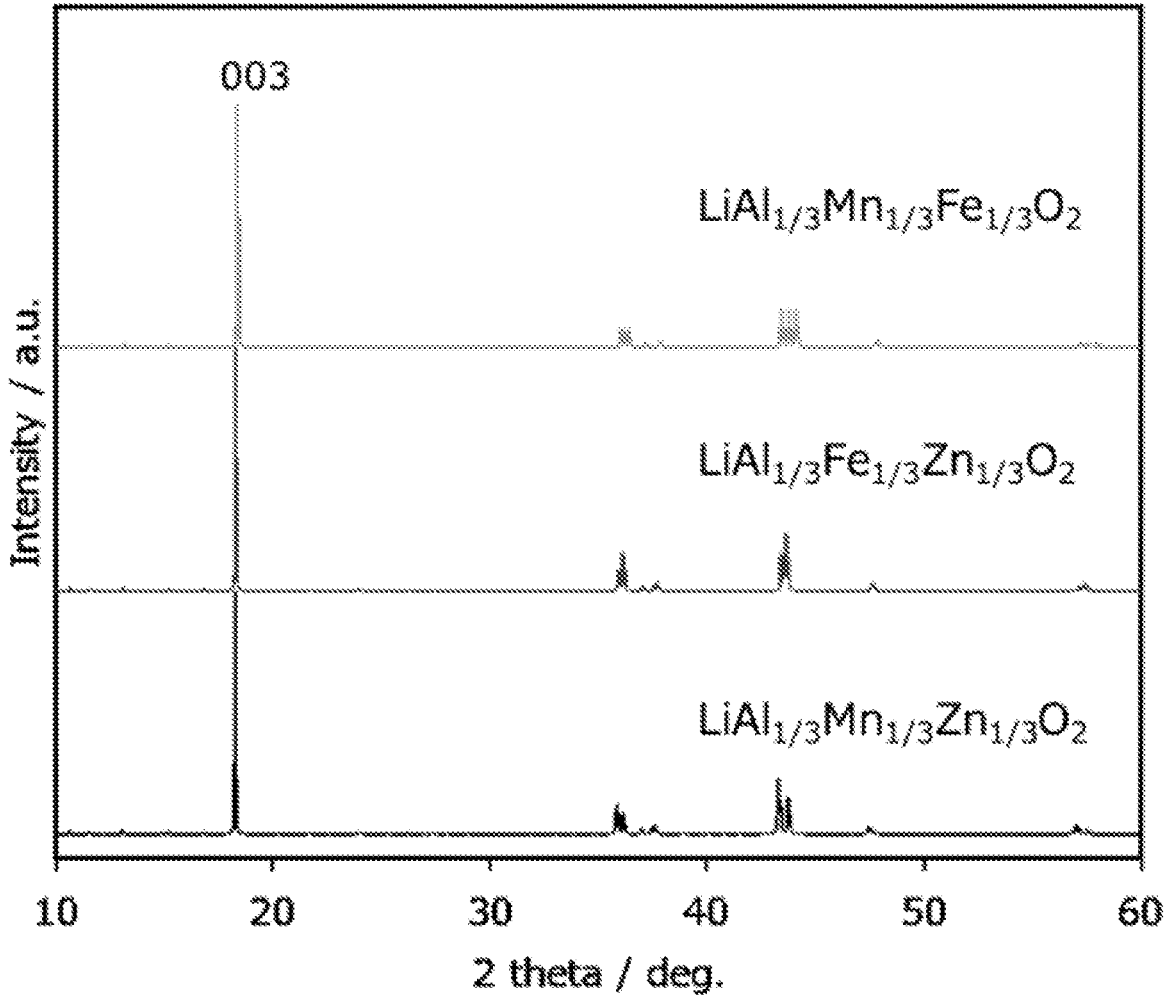
FIG. 2 illustrates exemplary XRD (x-ray diffraction) patterns of $Li(AlMnFeZn)O_2$ (simulated), in accordance with an embodiment of the present invention.

Powder XRD patterns of the cathode described above are shown in FIG. 2 (Bruker D3 Advance, 1=0.15418 nm, Cu-Kα X-ray source). As illustrated in FIG. 2, the synthesized cathode in accordance with the present invention should contain at least one peak corresponding to (104), (110), (113), (101), (102), or (003) lattice spacings. The observed 003 peak should be located between 2θ=17.5° to 20.5°.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A cathode material for use in a lithium (Li)-ion battery, the cathode material comprising:

$Li_aAl_{1-x-y-z}Fe_xMn_yZn_zO_{2-\delta}$, wherein a, x, y, z, and δ are in a range of $0.95 \le a \le 1.2$; $0 \le x \le 0.3$; $0 \le y \le 0.3$; $0 \le z \le 0.3$; $0.5 \le x+y+z \le 0.99$; $0 \le \delta \le 0.1$, wherein the cathode material comprises Zn and at least one of Mn or Fe, and wherein the cathode material does not comprise Ni or Co.

2. The cathode material of claim 1, wherein the cathode material has a layered rock-salt structure characterized by an X-ray diffraction (XRD) pattern obtained using Cu-Kα radiation (λ=0.15418 nm) comprising at least one characteristic peak corresponding to (104), (110), (113), (101), (102) or (003) lattice spacings and wherein the observed (003) peak is located between 2θ=17.5° to 20.5°.

3. The cathode material of claim 1, wherein the cathode material is synthesized using a method selected from co-precipitation, citrate process, hydrothermal, ion exchange and solid-state reactions.

4. A lithium (Li)-ion battery (LIB) comprising:

a cathode composed of a cathode material comprising $Li_aAl_{1-x-y-z}Fe_xMn_yZn_zO_{2-\delta}$, wherein a, x, y, z, and δ are in a range of $0.95 \le a \le 1.2$; $0 \le x \le 0.3$; $0 \le y \le 0.3$; $0 \le z \le 0.3$; $0.5 \le x+y+z \le 0.99$; $0 \le \delta \le 0.1$, wherein the cathode material comprises Zn and at least one of Mn or Fe, and wherein the cathode material does not comprise Ni or Co;

an anode; and an electrolyte positioned between the anode and the cathode.

5. The LIB of claim 4, wherein the cathode material has a layered rock-salt structure characterized by an X-ray diffraction (XRD) pattern obtained using Cu-Kα radiation (λ=0.15418 nm) comprising at least one characteristic peak corresponding to (104), (110), (113), (101), (102) or (003) lattice spacings and wherein the observed (003) peak is located between 2θ=17.5° to 20.5°.

6. The LIB of claim 4, wherein the cathode material is synthesized using a method selected from co-precipitation, citrate process, hydrothermal, ion exchange and solid-state reactions.

* * * * *